Nov. 19, 1974 J. D. EVANS Re. 28, 244

STOCK RACK

Original Filed May 4, 1970

INVENTOR

JOHN D. EVANS

BY Cushman, Darby & Cushman

ATTORNEYS

United States Patent Office

Re. 28,244
Reissued Nov. 19, 1974

28,244
STOCK RACK

John D. Evans, Rocky Mount, N.C., assignor to Metals, Inc., Rocky Mount, N.C.

Original No. 3,696,763, dated Oct. 10, 1972, Ser. No. 34,456, May 4, 1970. Application for reissue May 22, 1973, Ser. No. 362,856
Int. Cl. A47b *3/06*
U.S. Cl. 108—157 12 Claims

Matter enclosed in heavy brackets [ ] appears in the original patent but forms no part of this reissue specification; matter printed in italics indicates the additions made by reissue.

ABSTRACT OF THE DISCLOSURE

A knock-down stock rack including a pair of upright standards having tubular socket members secured thereto and connected by means of longitudinally extending support members having downwardly extending dowels which are telescopically received in the socket members, the stock rack having a rectangular shelf seated upon the support members for maintaining the posts in rectangular alignment.

*This is a reissue of U.S. Pat. 3,696,763, granted Oct. 10, 1972, which was based on application Ser. No. 34,456, filed May 4, 1970.*

BACKGROUND OF THE INVENTION

This invention relates to a stock rack and more particularly to a stock rack which can be easily assembled and knocked down.

It is desirable to have stock racks which are rigid and strong and yet which can be easily assembled and disassembled. As a result, every effort is made to render the stock rack simple in construction and convenient to erect and knock down. Moreover, it is desirable to have such stock racks erectable by unskilled labor without the aid of any tools whatsoever.

As described in detail hereinafter, applicant previously used a stock rack which attempted to meet many of the criteria listed above. The stock rack was simple to assemble, but there were problems in stamping out the parts and in supporting heavy loads once the stock rack was assembled. In order to make the stock rack rigid, it was necessary for the longitudinal support members to include a thin bar which was received in slots in tubular socket members. While this rack was sufficiently rigid, it was unnecessarily expensive to make because slots had to be cut in the socket members and the slots had to be perfectly aligned. Moreover, when a heavy weight was placed upon the shelf, the entire weight was apt to be borne by the bottom of the slot. Consequently, this point tended to be an area of potential failure.

SUMMARY OF THE INVENTION

The present invention eliminates the necessity of putting a slot in the tubular socket members. As a result, savings are accomplished in the basic manufacturing step. However, by eliminating the slot, the frame of the stock rack is not particularly rigid. The use of a shelf sitting on the longitudinal support members, and preferably on the cross-struts, and receiving the four posts of the stock rack in cut-outs at each corners provides sufficient rigidity to the frame to make an effective stock rack.

This new stock rack meets all of the desirable characteristics of stock racks. It is both rigid and strong and can be easily assembled by an unskilled laborer without the aid of any tools. Moreover, it has a minimum of parts, and the expense of manufacturing the stock rack is reduced.

Other objects and advantages of the present invention will be more readily apparent from the following detailed description.

DESCRIPTION OF THE PREFERRED EMBODIMENTS

Figure 1:
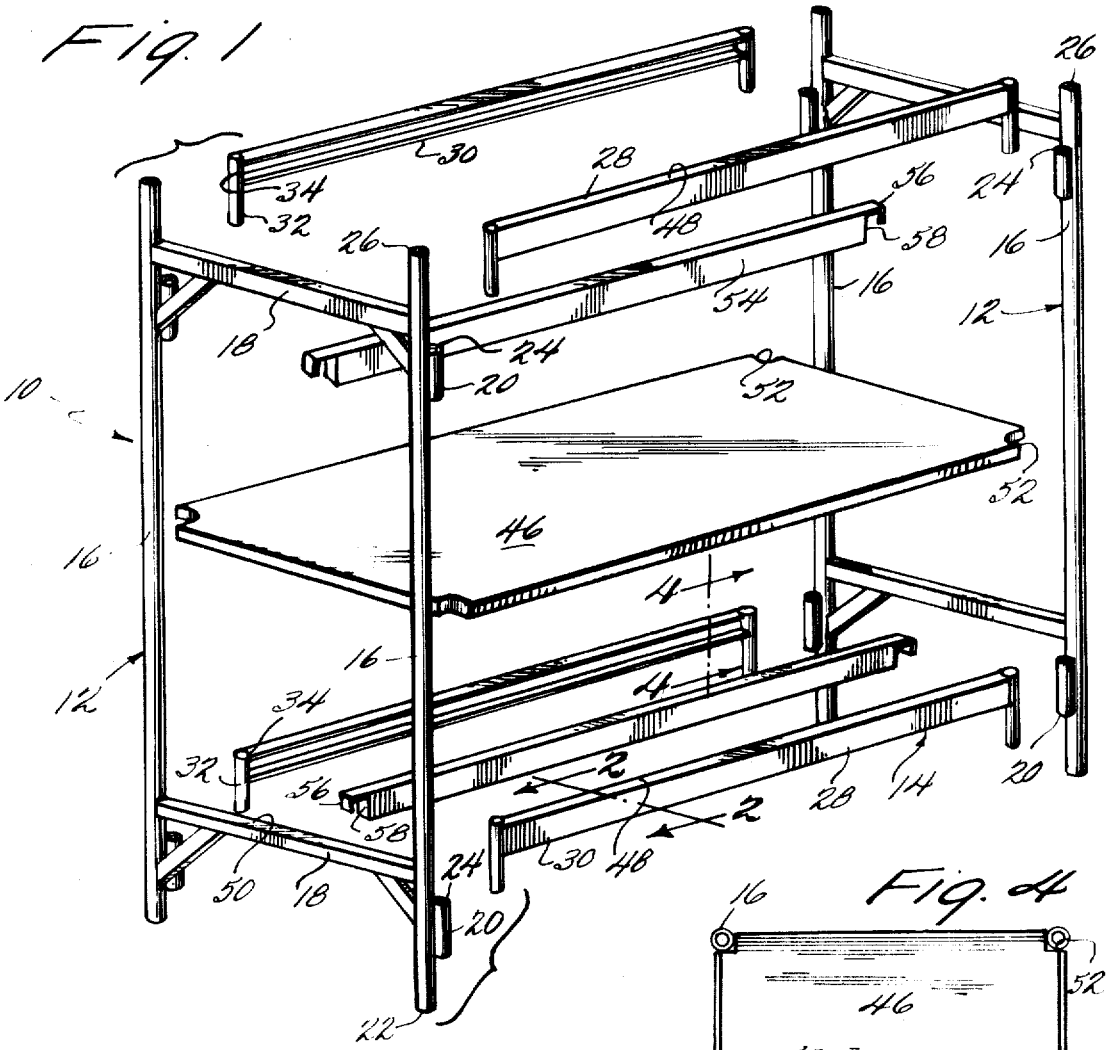
FIG. 1 is an exploded perspective view of the stock rack.

The knock-down stock rack 10, as shown in FIG. 1, includes a pair of longitudinally spaced, substantially upright standards 12 joined together by longitudinally extending support members 14. Each upright standard 12 includes a pair of transversely spaced, substantially upright posts 16. Cross-cuts 18 are secured to and extend between transversely aligned posts. Preferably, the cross-struts 18 are fixedly secured to the posts 16 so that the entire end standard is assembled at the factory.

Figure 4:
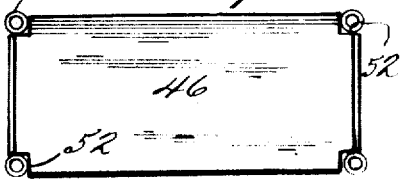
FIG. 4 is a reduced sectional plan view taken substantially along the lines 4—4 of FIG. 1.
Figure 2:
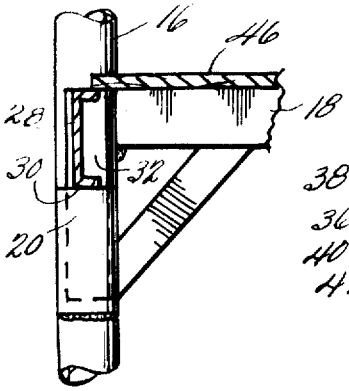
FIG. 2 is an enlarged fragmentary sectional view taken substantially along the lines 2—2 of FIG. 1.

It will be noted (see FIG. 4) that the posts 16 are arranged in a rectangular alignment. Upright, tubular socket members 20 are secured to each post with at least one of such socket members being intermediate the free ends 22 and 26 of the posts so that the upper edge 24 of said one socket is disposed from the upper end 26 of the post for a reason to be more fully explained hereinafter. The tubular socket members 20 lie in an upright plane defined by and extending between two longitudinally aligned posts 16. While the socket members are described as being tubular, it should be appreciated that this design is simply the most desirable configuration. The socket member could, in fact, assume any type of configuration although the tubular structure offers the cheapest and most easily obtained component part.

The longitudinally extending support members 14 preferably comprise a bar or channel beam 28 having a flat bottom surface 30. Downwardly extending dowels 32 are secured to the free ends 34 of the beam 28. The dowels 32 are telescopically and preferably snugly received in the socket members 20. When assembled, the flat bottom surface 30 of the beam 28 rests on the upper edge 24 of the socket members associated with that particular beam.

Figure 3:
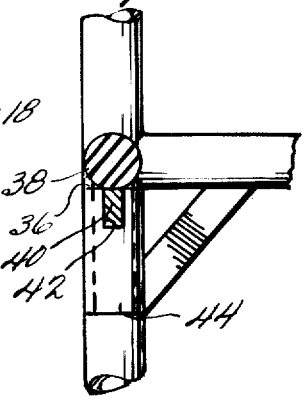
FIG. 3 is an enlarged fragmentary sectional view of the prior art taken in substantially the same position as FIG. 2.

The construction of the beam can be contrasted with the construction of the beam in the prior art, shown in FIG. 3. In this figure, there is shown a bar 38 having a flat plate 40 depending from the underside thereof. The plate could extend the length of the bar or be positioned only adjacent each end of the bar. The flat plate 40 extends into a slot 42 in the socket member 44. With the flat plate prevented from lateral movement by the slot, the stock rack is held substantially rigid. However, it will be noted that the entire weight of the load can be carried by the flat plate and associated slot in this particular arrangement. The bar, bearing against the upper end 36 of the socket member, could also carry some or all of the weight. However, it will be appreciated that the socket member is somewhat weakened due to the slot and some care must be exercised in aligning the slots of aligned socket members.

In order to maintain the posts 16 of the stock rack in substantially rectangular alignment and thus make the stock rack substantially rigid, there is provided at least one rectangular shelf 46 which is adapted to be seated upon the support members 14. Preferably, the upper surfaces 48 of at least one pair of beams 28 and the upper surfaces 50 of at least one pair of cross-struts 18 lie substantially in the same horizontal plane so that both the beam and the cross-strut support the rectangular shelf. It will be noted from FIG. 4 that the shelf extends between the posts and includes a preferably right-angled cut-out 52 in each corner. Each post 12 is at least partially received within the cut-out 52. If the stock rack includes more than two upright standards, adjacent shelves would have to receive approximately one-half of the post shared with another shelf.

It may be desirable to include an intermediate support member 54 with shelves of same widths. The intermediate support member 54 shown in FIG. 1 comprises a beam, such as a channel beam, which extends between and is secured to the cross-struts 18. In one operative embodiment, outwardly and downwardly extending L-shaped arms 56 are secured to the free ends 58 of the intermediate support member 54 and fit over a cross-strut.

Figure 5:
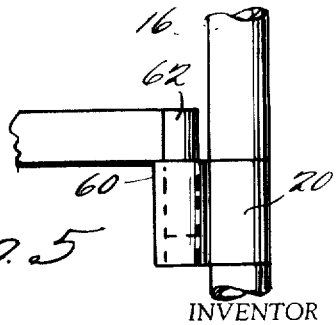
(PRIOR ART) Fig. 5
FIG. 5 is an enlarged fragmentary, side elevational view of a modifiaction of the upright standards.

While it is preferable to make the end standards substantially rigid by making the cross-struts fixedly secured to the posts, it will be appreciated that the cross-struts could be connected to the posts in the same manner as the longitudinally extending support members are connected. Accordingly, there is shown in FIG. 5 an embodiment including upright, tubular socket members 60 secured to each post 16 and lying in an upright plane defined by and extending between two transversely aligned posts. These socket members 60 are preferably vertically aligned with the socket members 20 so that the upper surfaces of the support members and cross-struts will lie in the same horizontal plane. It will be appreciated, however, that differences in elevation of the two socket members can be compensated by differences in the depth of the support member and the cross-strut. In the embodiment shown in FIG. 5, the cross-struts have downwardly extending dowels 62 secured to their free ends. The dowel 62 is telescopically and snugly received in the transversely aligned socket members 60.

In order for the rectangular shelf 46 to operate in the manner described, the shelf must cooperate with the posts. Therefore, it will be seen that it is necessary for at least one pair of socket members to be disposed from the upper end of the posts so that there is sufficient space on top of the socket members for the rectangular shelf to engage the posts. Each post would generally carry two or more socket members, depending upon the height of the post and the number of shelves contemplated for that particular height. It will be seen that numerous variations could be made within the design described above.

It will be appreciated that while reference is made to a rectangular shelf and the rectangular alignment of the posts, the word "rectangular" encompasses square alignment. Moreover, while the invention disclosed herein is contemplated for use as a stock rack, it is adequately clear that the same could be used as scaffolding and the like.

While the preferred forms of the invention have been illustrated in the drawing and discussed above, it should be adequately clear that considerable modification may be made thereto without departing from the principles of the invention. Therefore, the foregoing should be considered in an illustrative sense rather than a limiting sense. Accordingly, the extent of this invention should be limited only by the spirit and the scope of the claims appended hereto.

What is claimed is:

1. A knock-down stock rack comprising:

a pair of longitudinally spaced, upright standards, each standard including a pair of transversely spaced, upright posts;

at least one upright tubular socket member secured to each post intermediate its free ends and lying in an upright plane defined by and extending between two longitudinally aligned posts, the upper end of each socket member being spaced from the upper end of the post;

a longitudinally extending support member extending between each longitudinally aligned post, each support member having a pair of downwardly extending dowels secured to the free ends thereof and telescopically received in the socket members secured to the posts; and at least one rectangular shelf seated upon the support members and extending between the posts, the shelf having a cut-out at each corner within which each post is at least partially received, the shelf maintaining the posts in a rectangular alignment and increasing the rigidity of the stock rack.

2. The rack defined in claim 1 additionally comprising cross-struts which are fixedly secured to and extend between transversely aligned posts.

3. The rack defined in claim 1 additionally comprising an upright tubular socket member and secured to each post and lying in an upright plane defined by and extending between two transversely aligned posts, these socket members being vertically aligned with the longitudinally aligned sockets, and additionally comprising cross-struts extending between transversely aligned posts and a downwardly extending dowel secured to each end of each cross-strut and telescopically received in the transversely aligned socket members.

4. The rack defined in claim 3 wherein each transversely extending cross-strut comprises a beam having a flat bottom surface which rests on the upper edge of its associated socket members.

5. The rack defined in claim 1 wherein each longitudinally extending support member comprises a beam having a flat bottom surface which rests on the upper edge of its associated socket members.

6. The rack defined in claim 1 additionally comprising cross-struts extending between transversely aligned posts and an intermedate, longitudinally extending support member lying intermediate the outer support members extending between the longitudinally aligned posts, each end of the intermediate support member being supported by a cross-strut.

7. The rack defined in claim 6 wherein each end of the intermediate support member has an outwardly and downwardly extending L-shaped arm which fits over a cross-strut.

8. The rack defined in claim 1 wherein the upper surfaces of at least one pair of longitudinally extending support members and at least one pair of cross-struts lie in substantially the same horizontal plane to both support the rectangular shelf.

9. The rack defined in claim 1 additionally comprising at least one pair of cross-struts which are fixedly secured to transversely aligned posts at a position spaced from the upper end of the posts and wherein each longitudinally extending support member comprises a beam having a flat bottom surface which rests on the upper edge of its associated socket members, the upper surfaces of the longitudinally extending support members and the upper surfaces of the cross-struts lying in substantially the same horizontal plane to both support the rectangular shelf.

10. The rack defined in claim 9 additionally comprising an intermediate, longitudinally extending support member lying intermediate the outer support members extending between the longitudinally aligned posts, each end of the intermediate support member being supported by a cross-strut.

*11. The rack defined in Claim 1 wherein:*

*the shelf performs the recited maintaining function through engagement of a plurality of the posts by the shelf within the respective cut-out corners; and*

*the tubular socket members have substantially continuous respective upper surfaces, each having a said longitudinally extending support member resting thereon adjacent a respective end of that said longitudinally extending support member.*

*12. The rack of Claim 11 wherein:*

*said substantially continuous respective upper surfaces are generally flat and generally horizontal, being unnotched so that adjacent each end thereof the lower extent of each respective longitudinally extending support member is at substantially the same level as is the respective tubular socket member upper surface.*

References Cited

The following references, cited by the Examiner, are of record in the patented file of this patent or the original patent.

UNITED STATES PATENTS

| | | | |
|---|---|---|---|
| 1,172,355 | 2/1916 | Guest | 182—179 UX |
| 3,004,814 | 10/1961 | Schulze | 108—159 X |
| 3,306,692 | 2/1967 | Timmerman | 108—157 X |
| 3,521,579 | 7/1970 | Stafford | 108—153 X |

JAMES C. MITCHELL, Primary Examiner

U.S. Cl. X.R.

108—111; 211—148